Figure 1:
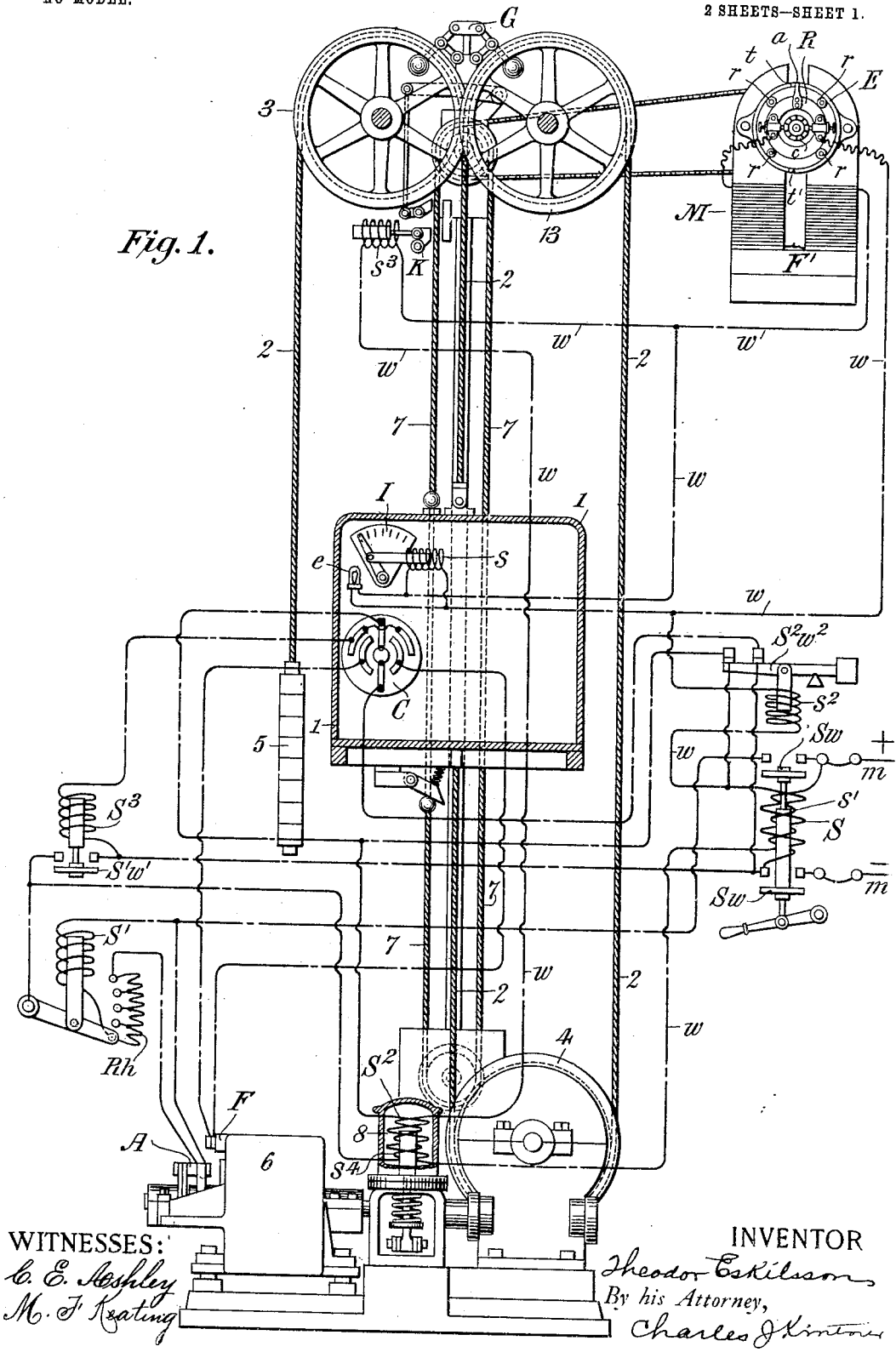

No. 767,930.

Patented August 16, 1904.

UNITED STATES PATENT OFFICE.

THEODOR ESKILSSON, OF ASTORIA, NEW YORK, ASSIGNOR OF ONE-HALF TO AXEL MAGNUSON, OF NEW YORK, N. Y.

SAFETY APPLIANCE AND SPEED-CONTROLLING APPARATUS FOR ELEVATORS.

SPECIFICATION forming part of Letters Patent No. 767,930, dated August 16, 1904.

Application filed June 6, 1904. Serial No. 211,346. (No model.)

*To all whom it may concern:*

Be it known that I, THEODOR ESKILSSON, a citizen of the United States, and a resident of Astoria, Long Island City, county of Queens, and State of New York, have made a new and useful Invention in Safety Appliances and Speed-Controlling Apparatus for Elevators, of which the following is a specification.

My invention is directed particularly to that type of safety appliances in which the same are brought into effective operation when the car assumes a maximum speed, or, in other words, a speed greater than that which it is deemed safe for which it should be run; and it has for its objects, first, the generation of electrical currents by an independent dynamo or magneto-electric generator operatively connected to the car or the mechanism which controls the movement thereof in such manner that said generator shall set up electrical currents of potential which vary with the speed of the car and to utilize the same for controlling safety mechanism as desired; second, to provide such a system with electrically-controlled indicating mechanism located in the car for giving a visual indication of the fact that the independent generator is operating when the car is moving; third, to provide such a system with indicating mechanism located also in the car for indicating the actual current-flow from the generator, hence giving a direct indication of the actual speed of the car; fourth, to provide such a system with electrical circuit connections between the independent generator and the main switch which controls the current-flow to the electric motor which drives the car; fifth, to provide such a system with circuit connections extending from the generator to an independent switch for interrupting the circuit connections between the main switch and the controller on board the car; sixth, to provide such a system with circuit connections between the independent generator and the magnet which controls the operation of the brake, whereby when said generator reaches a predetermined speed the brake will be automatically applied; seventh, to provide such a system with circuit connections between the independent generator and grip or clutch controlling mechanism adapted to act upon the controlling apparatus on the car in such manner as to stop the same when the latter reaches a predetermined speed; eighth, to provide such a system with a dynamo or magneto-electric generator operatively connected with the power-driven apparatus which controls the movements of the car and so connected therewith that the currents generated thereby are always caused to flow in the same direction.

For a full and clear understanding of the invention, such as will enable others skilled in the art to construct and use the same, reference is had to the accompanying drawings, in which—

Figure 2:
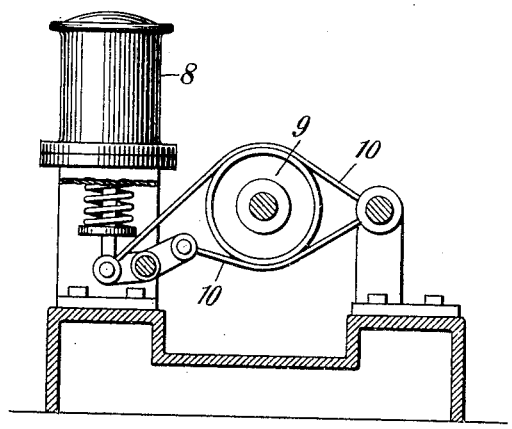
Figure 3:
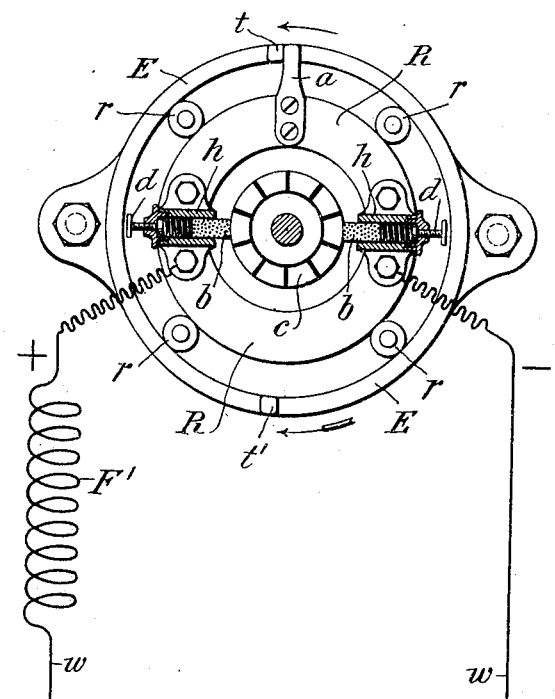

Figure 1 is a vertical sectional view taken through an elevator system of well-known type in which the car is electrically driven, parts of the apparatus being shown in elevational view and the electrical circuits and circuit connections in diagrammatic view, my improvements being illustrated as applied thereto. Fig. 2 is an enlarged part sectional part elevational view of a brake-controlling apparatus of well-known form as applied to the system, said view being taken on a section-line through the lower part of Fig. 1 and as seen looking thereat from left to right. Fig. 3 is an enlarged end elevational view of the means for causing the current from the dynamo or magneto electric machine driven by the car to always flow in the same direction no matter which way said car may be moving, the commutator-brushes and their holders being shown in sectional view.

Referring now to the drawings in detail, 1 represents an elevator-car suspended by cables 2 2, passing over the usual sheaves 3 3 at the top and driving-drum 4 at the bottom of the elevator-shaft, 5 being the usual counterweight secured to one end of one of the supporting-cables.

6 is an electric motor geared in the usual way to the driving-drum 4 and provided with the usual armature A, connected through a speed-controlling rheostat $Rh$ in the engine-room, a controller C on board of the car and a main-circuit switch $Sw$ in the engine-room connected directly to the + and − mains $m\ m$, running to the dynamo, (not shown,) fuses being provided, as shown, between the main switch and the mains.

F is the field-circuit connected in shunt to the armature by the controller on the car.

7 7 represent a controlling cord or cable extending upward and downward through the car in the usual way to the usual guiding and supporting sheaves at the bottom and top of the shaft and provided with the well-known means for connecting said cable to the controller C in the car.

G is a power-driven governor of usual type connected through gearing and levers to a grip for regulating the action of the controller mechanism for abnormally-high speeds of the car.

$S'w'$ is a switch connecting one of the current-mains $m$ directly with a movable arm, which is connected in turn to the core of the coil $S^1$ for controlling the current-flow in a well-known manner to the armature A of the motor 6.

$S^2$ is a solenoid-coil connected to the main circuit for controlling the application of the brake, which is illustrated in Fig. 2 as of the usual or well-known type of strap-brake, 8 being the inclosing casing for the controlling-solenoid, 9 the brake-drum, connected directly to the same shaft which carries the power-drum 4, and 10 the brake-strap, connected in the usual manner to the brake-controlling solenoid-core.

$S^3$ is a solenoid-coil connected directly in circuit with one of the current-mains and the controller C on board of the car, the function of said coil being to effect, when the movable part of the controller C is moved in either direction, the operation of the switch $S'w'$, and hence establish the flow of current to the armature-circuit A.

S is a solenoid-coil in shunt with the current-mains $m\ m$, its function being to hold the main switch $Sw$ closed when the latter is closed manually.

The devices so far described are not essentially different from types of elevator-controlling apparatus in well-known use.

I will now describe the improved features for accomplishing the objects above set forth, the same consisting of a dynamo or magneto electric generator M, secured, preferably, at a point near the top of the elevator-shaft and having its armature geared by a belt or otherwise to some part of the power-driven apparatus which controls the movement of the car, in this instance to a pulley or sprocket-wheel, which is geared in turn to gear-wheels carried by either one or both of the sheaves 3 in such manner that the rotation of such sheaves necessarily imparts to the pinion and the armature of the dynamo M the proper speed.

$w\ w\ w$ are conductors in multiple-arc relation running, respectively, to a solenoid-coil $s$ of an indicator I in the car—such, for instance, as a voltmeter and an incandescent lamp $e$, also in the car $s^2$, being a similar solenoid-coil located at some point beside the shaft and having a core adapted to control the movements of a controlling-switch $S^2w^2$, having circuits running from the current-mains to the controller C on board the car, $s^3$ being a solenoid-coil located, preferably, near the top of the elevator-shaft and having a core adapted to control the movement of a grip or clutch K for automatically stopping the car.

$s'\ s^4$ are differential windings also in circuit with the generator M for counteracting the magnetic effect of the coils of the solenoid S of the main switch $Sw$ and $S^2$ of the brake-solenoid.

Inasmuch as the solenoids S and $S^2$ are differential windings and as the indicator I in the car is a voltmeter of well-known form, it is important that the current generated by the dynamo or magneto electric machine M shall always flow in the same direction. For the purpose of effecting this I support the commutator-brushes $b\ b$ in holders $h\ h$, secured directly to and insulated from a metallic ring R and journal said ring R upon roller-bearings, four or more in number, $r\ r\ r\ r$, adapted to move within the inner surface of a second metallic ring E, secured by bolts, as shown, directly to the frame of the machine and in such manner that the commutator-brushes may move through one hundred and eighty degrees of arc in either direction around the commutator $c$, an arm $a$ being provided and limiting-stops $t$ and $t'$, integral with the ring E and located in the path of said arm, $d\ d$ being adjusting-screws for regulating the pressure upon springs which bear in turn upon the outer ends of the commutator-brushes. (See Fig. 3.)

The operation is as follows: Upon the assumption that the elevator is held by the brake in the position shown, owing to the fact that the main switch $Sw$ is open, as is also the controller C, it will be understood that upon closing the main switch the coils of the solenoid S will maintain it in a closed position, so that as long as the controller C is turned to the proper position by the attendant the switch $S'w'$ will be closed by reason of a flow of current through the solenoid-coil $S^3$, so that the elevator will move in the desired direction up or down, dependent upon the direction of movement of the controller. As the car descends, for instance, an electromotive force will be set up through the conductors $w\ w$ from the independent dynamo M and through the respective coils $s\ s'\ s^2\ s^3\ s^4$. So long as the speed of the car is within the maximum speed for which it is desired to run the car will descend; but should this speed increase abnormally the potential set up in the conductors $w\ w$ will cause the solenoid-coil $S^3$ to operate the clutch K, thereby causing the controlling-cable 7 to move the controller-contacts to the off or open position. At the same time the solenoid-coil $s^2$ will interrupt the controlling-switch $S^2w^2$, breaking the circuit to the controller. The differential coil $s'$, counteracting the effect of the main coil S in the controlling-solenoid for the main switch $Sw$, will cause the main circuit to be interrupted at that point. At the same time the differential effect of the solenoid $s^4$ of the brake-solenoid will cause the brake to be applied, so that the car will be automatically stopped in its ascent. The indicator in the car, together with the electric lamp $e$, will give at all times a correct indication of the speed at which the car is traveling. In other words, when the car is standing still there will be no indication in the indicator I, which may be in the nature of any well-known form of voltmeter, nor will there be any indication in the lamp $e$. The attendant will be governed as to the speed at which his car may be run either by the glow of the lamp $e$ or by the indication of the indicating-hand on the voltmeter I, which may be calibrated to indicate volts and have also a speed-indicating dial to show the relative speeds. Upon the supposition that the car is descending and that the arm $a$, carried by the ring R, is in the position shown in Figs. 1 and 3, the commutator-brushes will be in the position shown in these two figures. The movement of direction being reversed, however, there is friction enough between the inner ends of the brushes $b$ $b$ and commutator $c$ to cause the same to be carried in the direction of the tailed arrow at the bottom of Fig. 3 through one hundred and eighty degrees, so that the arm $a$ will come into mechanical contact with the stop $t'$ at the bottom of that figure of the drawings. Consequently as the car continues to ascend the direction of the flow of current will be the same by reason of the fact of such commutator reversal.

I do not limit my invention to the specific details herein described, as many of the features thereof may be materially departed from and still come within the scope of my claims hereinafter made. I believe it is generically new with me to provide an elevator with a dynamo or magneto electric machine which is driven by the movement of the car or some interconnected part between the same and the source of power and to utilize the currents generated by such independent dynamo-electric machine to effect the stoppage of the car for abnormal speeds and to give indication in the car of the actual speed at which the same is traveling. I believe it is also broadly new with me to utilize such automatically-generated currents for the purpose of automatically applying the brakes and for the purpose of automatically interrupting the power-circuit and also for the purpose of automatically stopping the car for abnormal speeds through the agency of electrically-controlled means acting upon the controller in the car; nor do I limit myself to the use of such means in connection with electrically-controlled elevators, as obviously the same might be used in connection with steam, hydraulic, pneumatic, or any type of elevator, the essence of my invention lying in the use of dynamically-generated electrical currents the voltage of which is varied by variation of speed of the moving car and in such manner as to utilize such variable voltages to effect the result sought, and my claims are generic as to these features.

Although I have shown and described one means and method of effecting the maintenance of the current flowing from the dynamo or magneto electric machine M always in the same direction, I do not limit myself in this respect, as obviously such a result might be effected by numerous devices, either electrical or mechanical, as will be understood by those skilled in the art.

Having thus described my invention, what I claim, and desire to secure by Letters Patent of the United States, is—

1. An elevator provided with a dynamo or magneto electric machine operatively connected to the car; in combination with circuits and circuit connections therefrom including means for automatically stopping the car when it reaches a predetermined speed.

2. An elevator provided with a dynamo or magneto electric machine operatively connected to the car; in combination with electromagnetic means connected in circuit with said dynamo and means controlled thereby for causing the car to stop on attaining abnormal speeds.

3. An elevator provided with a dynamo or magneto electric machine having its armature connected to and driven by the source of power which drives the car; in combination with a brake normally held out of action; together with electromagnetic means operatively connected with said dynamo-electric machine for applying the brake when the car reaches an abnormal speed.

4. An elevator provided with a dynamo or magneto electric machine operatively connected to the car thereof and adapted to vary its speed with the speed of the car; in combination with circuit connections extending from said dynamo-electric machine to a controlling-switch for controlling the application of power to the car, through the controller carried thereby, the arrangement being such that for abnormal speeds of the car the controlling-switch will be opened.

5. An electric elevator provided with an electric motor operatively connected with means for moving the car; a source of electrical energy operatively connected to said motor and a controller on board the car; in combination with a brake operatively controlled by a part of the working current; together with a dynamo or magneto electric machine driven by the car and operatively connected with the brake in such manner that for abnormal speeds the car will be caused to stop automatically.

6. An electric elevator provided with a source of electrical energy; an electric motor operatively connected with mechanism for moving the car thereof; a controller carried by the car; a switch for connecting the motor to and disconnecting it from the source of electrical energy; a brake normally held out of action by electromagnetic means controlled by a part of the working current; in combination with a dynamo or magneto electric machine driven by the car as it ascends and descends and circuits and circuit connections from said dynamo-electric machine to electromagnetic controlling devices operatively connected with the controlling-switch, the brake, and the controller in such manner that the car is automatically stopped for abnormal speeds.

7. An electric elevator provided with a propelling electric motor operatively connected to a source of electrical energy; a brake provided with electromagnetic means for normally holding it out of action; a controller carried by the car; a main switch for connecting the circuits of the system to and disconnecting them from the driving source of electrical energy; a dynamo or magneto electric machine driven by the car and having circuit connections with the aforesaid switch and the brake, the arrangement being such that for abnormal speeds of the car the motor-circuit is interrupted and the brake automatically applied.

8. An electric elevator provided with a propelling electric motor; in combination with a dynamo or magneto electric machine operatively connected with the car and adapted to vary its speed with the speed of the car; together with a controller having circuits and circuit connections with the motor, and a controlling-switch having a controlling solenoid or electromagnet included in circuit with the aforesaid dynamo or magneto electric machine, the arrangement being such that for abnormal speeds of the car said controlling-switch will be actuated and the circuit to the controller disrupted.

9. In an electrically-controlled elevator a car operatively connected with a driving-drum geared in turn to a propelling electric motor having circuit connections with a source of electrical energy; a controller carried by the car; a main switch provided with electromagnetic means for holding it in a normally closed position; a brake having circuits and circuit connections with the driving source of electrical energy for normally holding it out of action, and a second or controlling switch electrically connecting the first-named switch with the controller carried by the car; in combination with a dynamo or magneto electric machine driven by the car and having electrical connections with both of the aforesaid switches and the brake, whereby when the car attains abnormal speed the circuits of both of the switches are broken and the brake applied.

10. An elevator having a dynamo or magneto electric machine operatively connected to and driven with the car as it moves in either direction; in combination with an electromagnet or solenoid operatively connected therewith and a grip or clutch adapted to act upon the controlling cord or cable.

11. An elevator having a dynamo or magneto electric machine operatively connected to and driven with the car as it moves in either direction; in combination with means for causing the current generated thereby to always flow in the same direction; together with circuits and circuit connections from the dynamo, and means for automatically stopping the car when it reaches a predetermined speed.

12. An elevator having a dynamo or magneto electric machine operatively connected to and driven with the car as it moves in either direction; in combination with pole-changing means controlled by the rotation of the armature thereof and adapted to cause the current generated thereby to always flow in the same direction; together with circuits and circuit connections from the dynamo, and means for automatically stopping the car when it reaches a predetermined speed.

13. An elevator having a dynamo or magneto electric machine operatively connected to and driven with the car as it moves in either direction; in combination with an electromagnetically-controlled brake having its controlling-coil in circuit with the source of electrical energy which furnishes current for the propelling-motor of the car and a differentially-wound coil in circuit with the before-mentioned dynamo or magneto electric machine.

In testimony whereof I have signed my name to this specification in the presence of two subscribing witnesses.

THEODOR ESKILSSON.

Witnesses:
   C. J. KINTNER,
   M. F. KEATING.